United States Patent
Xu et al.

(10) Patent No.: US 12,543,748 B2
(45) Date of Patent: Feb. 10, 2026

(54) ENZYMATIC METHOD FOR REDUCING USAGE AMOUNT OF FAT AND OIL IN BAKERY PRODUCT

(71) Applicant: Novozymes A/S, Bagsvaerd (DK)

(72) Inventors: Qing Xu, Beijing (CN); Yazhen Wang, Beijing (CN); Shouhong Li, Beijing (CN); Xiaoming Lu, Beijing (CN)

(73) Assignee: Novozymes A/S, Bagsvaerd (DK)

( * ) Notice: Subject to any disclaimer, the term of this patent is extended or adjusted under 35 U.S.C. 154(b) by 551 days.

(21) Appl. No.: 17/996,835

(22) PCT Filed: Apr. 28, 2021

(86) PCT No.: PCT/CN2021/090509
§ 371 (c)(1),
(2) Date: Oct. 21, 2022

(87) PCT Pub. No.: WO2021/218995
PCT Pub. Date: Nov. 4, 2021

(65) Prior Publication Data
US 2023/0320367 A1  Oct. 12, 2023

(30) Foreign Application Priority Data

Apr. 29, 2020 (CN) .......................... 202010355268.2
Sep. 3, 2020 (CN) .......................... 202010916112.7

(51) Int. Cl.
*A21D 8/04* (2006.01)
*A21D 2/16* (2006.01)
*A23D 9/007* (2006.01)

(52) U.S. Cl.
CPC ............. *A21D 8/042* (2013.01); *A21D 2/165* (2013.01); *A23D 9/007* (2013.01)

(58) Field of Classification Search
CPC ..................................................... A21D 8/042
See application file for complete search history.

(56) References Cited

U.S. PATENT DOCUMENTS

| | | |
|---|---|---|
| 2004/0028773 A1 | 2/2004 | Sturkenboom et al. |
| 2005/0202144 A1 | 9/2005 | Sturkenboom et al. |
| 2019/0029272 A1 | 1/2019 | Niemann |

FOREIGN PATENT DOCUMENTS

| | | |
|---|---|---|
| CN | 102113530 A | 7/2011 |
| CN | 105208869 A | 12/2015 |
| CN | 106259601 A | 1/2017 |
| CN | 106857749 A | 6/2017 |
| CN | 107223676 A | 10/2017 |
| CN | 107927087 A | 4/2018 |
| CN | 108601362 A | 9/2018 |
| CN | 109963469 A | 7/2019 |
| EP | 2486799 A1 | 8/2012 |
| JP | 2019071872 A | 5/2019 |
| TW | 1636733 B | 10/2018 |
| WO | 2012130969 A1 | 10/2012 |
| WO | 2014161876 A1 | 10/2014 |
| WO | 2017137487 A1 | 8/2017 |
| WO | 2018099965 A1 | 6/2018 |

OTHER PUBLICATIONS

Anonymous, Guiding Opinions of the General Office of State Administration for Market Regulation on Regulating the Use of Food Additives, 2019, 53—Translation.
Anonymous, Guiding Opinions of the General Office of State Administration for Market Regulation on Regulating the Use of Food Additives, 2019, No. 53.
TWI636733B—Liu et al., 2018, Abstract.

*Primary Examiner* — Jenna A Watts
(74) *Attorney, Agent, or Firm* — Yoshimi D. Barron

(57) ABSTRACT

Disclosed is a method for reducing the usage amount of edible fat and oil in a bakery product, the method comprising mixing at least one maltose alpha-amylase and edible fat and oil into dough, and baking same to prepare a bakery product. The usage amount of the edible fat and oil in the dough can be reduced by at least 10 wt % compared with not using the enzyme treatment; and the enzyme may also include cellulase and/or phospholipase. The method does not reduce or substantially reduce the quality of the bakery product, and allows same to have a shelf life of at least 4 days. Also involved is baked fat and oil prepared from the above-mentioned enzyme and edible fat and oil.

15 Claims, No Drawings
Specification includes a Sequence Listing.

SEQUENCE LISTING

<160> NUMBER OF SEQ ID NOS: 3

<210> SEQ ID NO 1
<211> LENGTH: 686
<212> TYPE: PRT
<213> ORGANISM: Bacillus stearothermophilus

<400> SEQUENCE: 1

```
Ser Ser Ser Ala Ser Val Lys Gly Asp Val Ile Tyr Gln Ile Ile Ile
1               5                   10                  15

Asp Arg Phe Tyr Asp Gly Asp Thr Thr Asn Asn Pro Ala Lys Ser
            20                  25                  30

Tyr Gly Leu Tyr Asp Pro Thr Lys Ser Lys Trp Lys Met Tyr Trp Gly
        35                  40                  45

Gly Asp Leu Glu Gly Val Arg Gln Lys Leu Pro Tyr Leu Lys Gln Leu
    50                  55                  60

Gly Val Thr Thr Ile Trp Leu Ser Pro Val Leu Asp Asn Leu Asp Thr
65                  70                  75                  80

Leu Ala Gly Thr Asp Asn Thr Gly Tyr His Gly Tyr Trp Thr Arg Asp
                85                  90                  95

Phe Lys Gln Ile Glu Glu His Phe Gly Asn Trp Thr Thr Phe Asp Thr
            100                 105                 110

Leu Val Asn Asp Ala His Gln Asn Gly Ile Lys Val Ile Val Asp Phe
        115                 120                 125

Val Pro Asn His Ser Thr Pro Phe Lys Ala Asn Asp Ser Thr Phe Ala
    130                 135                 140

Glu Gly Gly Ala Leu Tyr Asn Asn Gly Thr Tyr Met Gly Asn Tyr Phe
145                 150                 155                 160

Asp Asp Ala Thr Lys Gly Tyr Phe His His Asn Gly Asp Ile Ser Asn
                165                 170                 175

Trp Asp Asp Arg Tyr Glu Ala Gln Trp Lys Asn Phe Thr Asp Pro Ala
            180                 185                 190

Gly Phe Ser Leu Ala Asp Leu Ser Gln Glu Asn Gly Thr Ile Ala Gln
        195                 200                 205

Tyr Leu Thr Asp Ala Ala Val Gln Leu Val Ala His Gly Ala Asp Gly
    210                 215                 220

Leu Arg Ile Asp Ala Val Lys His Phe Asn Ser Gly Phe Ser Lys Ser
```

-continued

```
            225                 230                 235                 240
Leu Ala Asp Lys Leu Tyr Gln Lys Lys Asp Ile Phe Leu Val Gly Glu
                    245                 250                 255
Trp Tyr Gly Asp Asp Pro Gly Thr Ala Asn His Leu Glu Lys Val Arg
                    260                 265                 270
Tyr Ala Asn Asn Ser Gly Val Asn Val Leu Asp Phe Asp Leu Asn Thr
                    275                 280                 285
Val Ile Arg Asn Val Phe Gly Thr Phe Thr Gln Thr Met Tyr Asp Leu
                    290                 295                 300
Asn Asn Met Val Asn Gln Thr Gly Asn Glu Tyr Lys Tyr Lys Glu Asn
305                 310                 315                 320
Leu Ile Thr Phe Ile Asp Asn His Asp Met Ser Arg Phe Leu Ser Val
                    325                 330                 335
Asn Ser Asn Lys Ala Asn Leu His Gln Ala Leu Ala Phe Ile Leu Thr
                    340                 345                 350
Ser Arg Gly Thr Pro Ser Ile Tyr Tyr Gly Thr Glu Gln Tyr Met Ala
                    355                 360                 365
Gly Gly Asn Asp Pro Tyr Asn Arg Gly Met Met Pro Ala Phe Asp Thr
                    370                 375                 380
Thr Thr Thr Ala Phe Lys Glu Val Ser Thr Leu Ala Gly Leu Arg Arg
385                 390                 395                 400
Asn Asn Ala Ala Ile Gln Tyr Gly Thr Thr Gln Arg Trp Ile Asn
                    405                 410                 415
Asn Asp Val Tyr Ile Tyr Glu Arg Lys Phe Phe Asn Asp Val Val Leu
                    420                 425                 430
Val Ala Ile Asn Arg Asn Thr Gln Ser Ser Tyr Ser Ile Ser Gly Leu
                    435                 440                 445
Gln Thr Ala Leu Pro Asn Gly Ser Tyr Ala Asp Tyr Leu Ser Gly Leu
                    450                 455                 460
Leu Gly Gly Asn Gly Ile Ser Val Ser Asn Gly Ser Val Ala Ser Phe
465                 470                 475                 480
Thr Leu Ala Pro Gly Ala Val Ser Val Trp Gln Tyr Ser Thr Ser Ala
                    485                 490                 495
Ser Ala Pro Gln Ile Gly Ser Val Ala Pro Asn Met Gly Ile Pro Gly
                    500                 505                 510
Asn Val Val Thr Ile Asp Gly Lys Gly Phe Gly Thr Thr Gln Gly Thr
                    515                 520                 525
Val Thr Phe Gly Gly Val Thr Ala Thr Val Lys Ser Trp Thr Ser Asn
                    530                 535                 540
Arg Ile Glu Val Tyr Val Pro Asn Met Ala Ala Gly Leu Thr Asp Val
545                 550                 555                 560
Lys Val Thr Ala Gly Gly Val Ser Ser Asn Leu Tyr Ser Tyr Asn Ile
                    565                 570                 575
Leu Ser Gly Thr Gln Thr Ser Val Val Phe Thr Val Lys Ser Ala Pro
                    580                 585                 590
Pro Thr Asn Leu Gly Asp Lys Ile Tyr Leu Thr Gly Asn Ile Pro Glu
                    595                 600                 605
Leu Gly Asn Trp Ser Thr Asp Thr Ser Gly Ala Val Asn Asn Ala Gln
                    610                 615                 620
Gly Pro Leu Leu Ala Pro Asn Tyr Pro Asp Trp Phe Tyr Val Phe Ser
625                 630                 635                 640
Val Pro Ala Gly Lys Thr Ile Gln Phe Lys Phe Ile Lys Arg Ala
```

```
            645                 650                 655
Asp Gly Thr Ile Gln Trp Glu Asn Gly Ser Asn His Val Ala Thr Thr
            660                 665                 670
Pro Thr Gly Ala Thr Gly Asn Ile Thr Val Thr Trp Gln Asn
        675                 680                 685

<210> SEQ ID NO 2
<211> LENGTH: 686
<212> TYPE: PRT
<213> ORGANISM: Bacillus stearothermophilus

<400> SEQUENCE: 2

Ser Ser Ser Ala Ser Val Lys Gly Asp Val Ile Tyr Gln Ile Ile Ile
1               5                   10                  15

Asp Arg Phe Tyr Asp Gly Asp Thr Thr Asn Asn Pro Ala Lys Ser
            20                  25                  30

Tyr Gly Leu Tyr Asp Pro Thr Lys Ser Lys Trp Lys Met Tyr Trp Gly
        35                  40                  45

Gly Asp Leu Glu Gly Val Arg Gln Lys Leu Pro Tyr Leu Lys Gln Leu
    50                  55                  60

Gly Val Thr Thr Ile Trp Leu Ser Pro Val Leu Asp Asn Leu Asp Thr
65                  70                  75                  80

Leu Ala Gly Thr Asp Asn Thr Gly Tyr His Gly Tyr Trp Thr Arg Asp
                85                  90                  95

Phe Lys Gln Ile Glu Glu His Phe Gly Asn Trp Thr Thr Phe Asp Thr
            100                 105                 110

Leu Val Asn Asp Ala His Gln Asn Gly Ile Lys Val Ile Val Asp Phe
        115                 120                 125

Val Pro Asn His Ser Thr Pro Phe Lys Ala Asn Asp Ser Thr Phe Ala
    130                 135                 140

Glu Gly Gly Ala Leu Tyr Asn Asn Gly Thr Tyr Met Gly Asn Tyr Phe
145                 150                 155                 160

Asp Asp Ala Thr Lys Gly Tyr Phe His His Asn Gly Asp Ile Ser Asn
                165                 170                 175

Trp Asp Asp Arg Tyr Glu Ala Gln Trp Lys Asn Leu Thr Asp Pro Ala
            180                 185                 190

Gly Phe Ser Leu Ala Asp Leu Ser Gln Glu Asn Gly Thr Ile Ala Gln
        195                 200                 205

Tyr Leu Thr Asp Ala Ala Val Gln Leu Val Ala His Gly Ala Asp Gly
    210                 215                 220

Leu Arg Ile Asp Ala Val Lys His Phe Asn Ser Gly Phe Ser Lys Ser
225                 230                 235                 240

Leu Ala Asp Lys Leu Tyr Gln Lys Lys Asp Ile Phe Leu Val Gly Glu
                245                 250                 255

Trp Tyr Gly Asp Gly Pro Gly Thr Ala Asn His Leu Glu Lys Val Arg
            260                 265                 270

Tyr Ala Asn Asn Ser Gly Val Asn Val Leu Asp Phe Asp Leu Asn Pro
        275                 280                 285

Val Ile Arg Asn Val Phe Gly Thr Phe Thr Gln Thr Met Tyr Asp Leu
    290                 295                 300

Asn Asn Met Val Asn Gln Thr Gly Asn Glu Tyr Lys Tyr Lys Glu Asn
305                 310                 315                 320

Leu Ile Thr Phe Ile Asp Asn His Asp Met Ser Arg Phe Leu Ser Val
                325                 330                 335
```

Asn Ser Asn Lys Ala Asn Leu His Gln Ala Leu Ala Phe Ile Leu Thr
                340                 345                 350

Ser Arg Gly Thr Pro Ser Ile Tyr Tyr Gly Thr Glu Gln Tyr Met Ala
            355                 360                 365

Gly Gly Asn Asp Pro Tyr Asn Arg Gly Met Met Pro Ala Phe Asp Thr
        370                 375                 380

Thr Thr Thr Ala Phe Lys Glu Val Ser Thr Leu Ala Gly Leu Arg Arg
385                 390                 395                 400

Asn Asn Ala Ala Ile Gln Tyr Gly Thr Thr Thr Gln Arg Trp Ile Asn
                405                 410                 415

Asn Asp Val Tyr Ile Tyr Glu Arg Lys Phe Phe Asn Asp Val Val Leu
            420                 425                 430

Val Ala Ile Asn Arg Asn Thr Gln Ser Ser Tyr Ser Ile Ser Gly Leu
        435                 440                 445

Gln Thr Ala Leu Pro Asn Gly Ser Tyr Ala Asp Tyr Leu Ser Gly Leu
    450                 455                 460

Leu Gly Gly Asn Gly Ile Ser Val Ser Asn Gly Ser Val Ala Ser Phe
465                 470                 475                 480

Thr Leu Ala Pro Gly Ala Val Ser Val Trp Gln Tyr Ser Thr Ser Ala
                485                 490                 495

Ser Ala Pro Gln Ile Gly Ser Val Ala Pro Asn Met Gly Ile Pro Gly
            500                 505                 510

Asn Val Val Thr Ile Asp Gly Lys Gly Phe Gly Thr Thr Gln Gly Thr
        515                 520                 525

Val Thr Phe Gly Gly Val Thr Ala Thr Val Lys Ser Trp Thr Ser Asn
    530                 535                 540

Arg Ile Glu Val Tyr Val Pro Asn Met Ala Ala Gly Leu Thr Asp Val
545                 550                 555                 560

Lys Val Thr Ala Gly Gly Val Ser Ser Asn Leu Tyr Ser Tyr Asn Ile
                565                 570                 575

Leu Ser Gly Thr Gln Thr Ser Val Val Phe Thr Val Lys Ser Ala Pro
            580                 585                 590

Pro Thr Asn Leu Gly Asp Lys Ile Tyr Leu Thr Gly Asn Ile Pro Glu
        595                 600                 605

Leu Gly Asn Trp Ser Thr Asp Thr Ser Gly Ala Val Asn Asn Ala Gln
    610                 615                 620

Gly Pro Leu Leu Ala Pro Asn Tyr Pro Asp Trp Phe Tyr Val Phe Ser
625                 630                 635                 640

Val Pro Ala Gly Lys Thr Ile Gln Phe Lys Phe Phe Ile Lys Arg Ala
                645                 650                 655

Asp Gly Thr Ile Gln Trp Glu Asn Gly Ser Asn His Val Ala Thr Thr
            660                 665                 670

Pro Thr Gly Ala Thr Gly Asn Ile Thr Val Thr Trp Gln Asn
        675                 680                 685

<210> SEQ ID NO 3
<211> LENGTH: 686
<212> TYPE: PRT
<213> ORGANISM: Bacillus stearothermophilus

<400> SEQUENCE: 3

Ser Ser Ser Ala Ser Val Lys Gly Asp Val Ile Tyr Gln Ile Ile Ile
1               5                   10                  15

Asp Arg Phe Tyr Asp Gly Asp Thr Thr Asn Asn Asn Pro Ala Lys Ser
            20                  25                  30

```
Tyr Gly Leu Tyr Asp Pro Thr Lys Ser Lys Trp Lys Met Tyr Trp Gly
        35                  40                  45
Gly Asp Leu Glu Gly Val Arg Gln Lys Leu Pro Tyr Leu Lys Gln Leu
50                  55                  60
Gly Val Thr Thr Ile Trp Leu Ser Pro Val Leu Asp Asn Leu Asp Thr
65                  70                  75                  80
Leu Ala Gly Thr Asp Asn Thr Gly Tyr His Gly Tyr Trp Thr Arg Asp
                85                  90                  95
Phe Lys Gln Ile Glu Glu His Phe Gly Asn Trp Thr Thr Phe Asp Thr
                100                 105                 110
Leu Val Asn Asp Ala His Gln Asn Gly Ile Lys Val Ile Val Asp Phe
                115                 120                 125
Val Pro Asn His Ser Thr Pro Phe Lys Ala Asn Asp Ser Thr Phe Ala
130                 135                 140
Glu Gly Gly Ala Leu Tyr Asn Asn Gly Thr Tyr Met Gly Asn Tyr Phe
145                 150                 155                 160
Asp Asp Ala Thr Lys Gly Tyr Phe His His Asn Gly Asp Ile Ser Asn
                165                 170                 175
Trp Asp Asp Arg Tyr Glu Ala Gln Trp Lys Asn Phe Thr Asp Pro Ala
                180                 185                 190
Gly Tyr Ser Leu Ala Asp Leu Ser Gln Glu Asn Gly Thr Ile Ala Gln
                195                 200                 205
Tyr Leu Thr Asp Ala Ala Val Gln Leu Val Ala His Gly Ala Asp Gly
        210                 215                 220
Leu Arg Ile Asp Ala Val Lys His Phe Asn Ser Gly Phe Ser Lys Ser
225                 230                 235                 240
Leu Ala Asp Lys Leu Tyr Gln Lys Lys Asp Ile Phe Leu Val Gly Glu
                245                 250                 255
Trp Tyr Gly Asp Gly Pro Gly Thr Ala Asn His Leu Glu Lys Val Arg
                260                 265                 270
Tyr Ala Asn Asn Ser Gly Val Asn Val Leu Asp Phe Asp Leu Asn Pro
        275                 280                 285
Val Ile Arg Asn Val Phe Gly Thr Phe Thr Gln Thr Met Tyr Asp Leu
290                 295                 300
Asn Asn Met Val Asn Gln Thr Gly Asn Glu Tyr Lys Tyr Lys Glu Asn
305                 310                 315                 320
Leu Ile Thr Phe Ile Asp Asn His Asp Met Ser Arg Phe Leu Ser Val
                325                 330                 335
Asn Ser Asn Lys Ala Asn Leu His Gln Ala Leu Ala Phe Ile Leu Thr
                340                 345                 350
Ser Arg Gly Thr Pro Ser Ile Tyr Tyr Gly Thr Glu Gln Tyr Met Ala
                355                 360                 365
Gly Gly Asn Asp Pro Tyr Ser Arg Gly Met Met Pro Ala Phe Asp Thr
        370                 375                 380
Thr Thr Thr Ala Phe Lys Glu Val Ser Thr Leu Ala Gly Leu Arg Arg
385                 390                 395                 400
Asn Asn Ala Ala Ile Gln Tyr Gly Thr Thr Gln Arg Trp Ile Asn
                405                 410                 415
Asn Asp Val Tyr Ile Tyr Glu Arg Lys Phe Phe Asn Asp Val Val Leu
                420                 425                 430
Val Ala Ile Asn Arg Asn Thr Gln Ser Ser Tyr Ser Ile Ser Gly Leu
        435                 440                 445
```

-continued

```
Gln Thr Ala Leu Pro Asn Gly Ser Tyr Ala Asp Tyr Leu Ser Gly Leu
    450                 455                 460

Leu Gly Gly Asn Gly Ile Ser Val Ser Asn Gly Ser Val Ala Ser Phe
465             470                 475                 480

Thr Leu Ala Pro Gly Ala Val Ser Val Trp Gln Tyr Ser Thr Ser Ala
            485                 490                 495

Ser Ala Pro Gln Ile Gly Ser Val Ala Pro Asn Met Gly Ile Pro Gly
            500                 505                 510

Asn Val Val Thr Ile Asp Gly Lys Gly Phe Gly Thr Thr Gln Gly Thr
            515                 520                 525

Val Thr Phe Gly Gly Val Thr Ala Thr Val Lys Ser Trp Thr Ser Asn
530                 535                 540

Arg Ile Glu Val Tyr Val Pro Asn Met Ala Ala Gly Leu Thr Asp Val
545                 550                 555                 560

Lys Val Thr Ala Gly Gly Val Ser Ser Asn Leu Tyr Ser Tyr Asn Ile
                565                 570                 575

Leu Ser Gly Thr Gln Thr Ser Val Val Phe Thr Val Lys Ser Ala Pro
            580                 585                 590

Pro Thr Asn Leu Gly Asp Lys Ile Tyr Leu Thr Gly Asn Ile Pro Glu
            595                 600                 605

Leu Gly Asn Trp Ser Thr Asp Thr Ser Gly Ala Val Asn Asn Ala Gln
        610             615                 620

Gly Pro Leu Leu Ala Pro Asn Tyr Pro Asp Trp Phe Tyr Val Phe Ser
625             630                 635                 640

Val Pro Ala Gly Lys Thr Ile Gln Phe Lys Phe Phe Ile Lys Arg Ala
            645                 650                 655

Asp Gly Thr Ile Gln Trp Glu Asn Gly Ser Asn His Val Ala Thr Thr
            660                 665                 670

Pro Thr Gly Ala Thr Gly Asn Ile Thr Val Thr Trp Gln Asn
        675                 680                 685
```

ENZYMATIC METHOD FOR REDUCING USAGE AMOUNT OF FAT AND OIL IN BAKERY PRODUCT

CROSS-REFERENCE TO RELATED APPLICATIONS

This application is a 35 U.S.C. 371 national application of international application no. PCT/CN2021/090509 filed Apr. 28, 2021, which claims priority or the benefit under 35 U.S.C. 119 of International application nos. PCT/CN2020/10355268.2 and PCTCN202010916112.7 filed Sep. 3, 2020 and Apr. 29, 2020 the contents of which are fully incorporated herein by reference.

REFERENCE TO A SEQUENCE LISTING

The present application contains a sequence listing in computer readable form, which is incorporated herein by reference. The contents of the electronic sequence listing was created on Oct. 1, 2025, named SQ.txt and is 18,039 bytes in size. This replaces the previously filed sequence listing.

TECHNICAL FIELD

The present invention relates to a method for preparing a baked product, more specifically, to a method for reducing the usage amount of fat and oil in the baked product by an enzymatic method without reducing or substantially reducing the quality of the baked product.

BACKGROUND ART

The bakery industry in China has been developing rapidly since the end of the 20th century. As the acceptance level of western food has been raising and the consumption concept has been changed among Chinese residents, the food consumption has been further diversified, which will promote the total consumption quantity of the baked product to increase continuously. Because of differences in living habit and taste, the breads in European and American countries generally are relatively bland. Such breads can be eaten as the staple food or breakfast, which will not result in the intake of a large amount of sugar and fat and oil due to being the staple food. In contrast, the breads in China are sweet and fragrant, and have a relatively high fat and oil content.

The fat content of different breads varies greatly from several % to several tens %. For example, the fat and oil content of puff bread, such as crispy pie and crisp skin bread is very high, and the fat and oil content of toast is also not low. Although the addition of fat and oil enables the bread to be sweeter and softer, the cost of fat and oil is very high, which increases the calories and price of the bread, and the excessive amount of fat and oil is harmful to cardiovascular and cerebrovascular health and weight control. Therefore, lowering the oil content of bread may become one of the trends and demands of bread development in China.

"Guiding Opinions on Regulating the Use of Food Additives (No. 53 [2019] of the food production of the State Administration for Market Regulation)" issued by the State Administration for Market Regulation requires that the food producers and traders actively move ahead with the actions of salt reduction, oil reduction and sugar reduction during the production and processing of food. According to the national food safety standards of China GB-28050, if a manufacturer wants to declare that the product can reduce fat on the nutrition labels on pre-packaged food, the fat content of the product must be reduced by at least 25% compared with same kind of foods well known by the consumers.

Therefore, there is still a need to improve the existing process for preparing the baked product with a high oil content, and to reduce the usage amount of edible fat and oil during the preparation process without reducing or substantially reducing the quality of the baked product.

SUMMARY OF THE INVENTION

Although it is well known that maltose α-amylase can decompose amylopectin in flour, generate small molecular weight dextrin, prevent the aging and retrogradation of starch due to the interaction between starch and gluten, thus keeping the baked product soft, and lengthening the shelf life, the inventors of this application have now discovered that adding an effective amount of maltose α-amylase into a dough when preparing baked products with a relatively high oil content such as toast can significantly reduce the usage amount of edible fat and oil required by the preparation, and the quality of the prepared baked product does not worsen or substantially worsen as compared to the technical solution without using the enzyme and reducing the usage amount of edible fat and oil. In particular, when adding cellulase into the dough and forming a enzyme composition containing maltose α-amylase and cellulase, since the synergistic effect of maltose α-amylase and cellulase exists, it significantly reduces the content of edible fat and oil during the preparation while the quality of the prepared baked product is better.

In view of this, the present invention relates to a method for preparing a baked product from a dough, comprising steps of incorporating at least one maltose α-amylase into the dough and controlling the usage amount of edible fat and oil added in the dough, and preparing the baked product by baking, wherein due to the addition of the maltose α-amylase, the usage amount of edible fat and oil in the dough can be reduced by at least 10% by weight relative to the usage amount of edible fat and oil under the same condition except for the absence of the treatment by the enzyme. Preferably, in the prepared baked product with reduced oil, the content of the edible fat and oil is at least 1% (w/w), for example at least 2% (w/w), preferably at least 3% (w/w) by weight relative to the baked product. The baked product herein is, for example, "the baked product with reduced oil", referring to the baked product prepared in the present invention with a relatively low fat and oil content relative to that without using the process of the present invention.

The present invention also relates to a method for reducing the usage amount of edible fat and oil in a baked product prepared from a dough, comprising steps of incorporating at least one maltose α-amylase and edible fat and oil into the dough, and preparing the baked product by baking, wherein due to the addition of the maltose α-amylase, the usage amount of edible fat and oil in the dough can be reduced by at least 10% by weight relative to the usage amount of edible fat and oil under the same condition except for the absence of the treatment by the enzyme. Preferably, in the prepared baked product, the content of the edible fat and oil is at least 1% (w/w), for example at least 2% (w/w), preferably at least 3% (w/w) relative to the baked product. The baked product herein is, for example, "the high-oil baked product", referring to the oil content in the type of baked products is relatively high relative to other baked products with a mild taste, therefore it is worth using the process of the present invention to reduce the usage amount of fat and oil therein.

The present invention also relates to a method for preparing a baked product from a dough, comprising steps of incorporating cellulase, at least one maltose α-amylase and edible fat and oil into the dough, and preparing the baked product by baking. Preferably, in the prepared baked product, the content of the edible fat and oil is at least 1% (w/w), for example at least 2% (w/w), preferably at least 3% (w/w) by weight relative to the baked product.

In a preferred embodiment of the present invention, due to the addition of maltose α-amylase, compared with no maltose α-amylase, the usage amount of edible fat and oil in the dough can be reduced by at least 15%, at least 20%, preferably at least 25%, at least 30%, at least 35%, or more preferably at least 40% by weight relative to the usage amount of edible fat and oil under the same condition except for the absence of the treatment by the enzyme.

In a preferred embodiment of the present invention, the dough further contains cellulase and/or phospholipase.

In a preferred embodiment of the present invention, the dough also comprises the group consisting of: flour, edible salt and edible sugar, and preferably, can also comprise edible essence, yeast and/or vitamin C.

In a preferred embodiment of the present invention, the prepared baked product (for example at day 4, day 7 or day 14) has a lower hardness value and/or higher elasticity value compared with the prepared baked product under the same condition except for not adding the enzymes into the dough and not reducing the usage amount of edible fat and oil.

In a preferred embodiment of the present invention, the sensory evaluation of the prepared baked product does not worsen or substantially worsen compared with the prepared baked product under the same condition except for not adding the enzymes into the dough and not reducing the usage amount of edible fat and oil.

In a preferred embodiment of the present invention, for bread, the sensory evaluation is the comprehensive evaluation of touch softness, bread crumb structure, taste softness and taste moisture. More preferably, the sensory evaluation further comprises the evaluation of olfactory fragrance and gustatory aroma.

In a preferred embodiment of the present invention, for cake, the sensory evaluation is the comprehensive evaluation of taste softness, taste moisture and melt-in-the-mouth effect. Preferably, the sensory evaluation further comprises the evaluation of viscidity of the cake.

The method according to any of preceding claims, wherein the dough comprises the flour selected from the group consisting of: wheat, barley, rye, oat, corn, sorghum, rice, millet, and any mixture thereof.

The present invention also relates to the use of maltose α-amylase or the combination of maltose α-amylase and cellulase for reducing the usage amount of edible fat and oil when preparing the baked product with a shelf life of at least 4 days from a dough.

DETAILED DESCRIPTION OF EMBODIMENTS

Baked Product

The process of the present invention can be used for any baked product from a dough, whether of soft or crisp properties, and whether of a white, light or dark type. In the baked product prepared by the process of the present invention, the content of the edible fat and oil is at least 1% (w/w) or at least 2% (w/w), preferably at least 3% (w/w) relative to the baked product, or the content of the edible fat and oil is at least 4% (w/w) relative to the baked product, or the content of the edible fat and oil is at least 5% (w/w) relative to the baked product, or the content of the edible fat and oil is at least 6% (w/w) relative to the baked product. Although there is still a certain content of edible fat and oil in the baked product, using the process of the present invention has significantly reduced the content of the edible fat and oil relative to that without using the process of the present invention, in the case that the sensory evaluation of the prepared baked product does not worsen or substantially worsen.

In a preferred embodiment of the present invention, the typical examples of the baked products are breads, for example soft breads, preferably bun, toast, French roll and milk bar breads. In a preferred embodiment of the present invention, the examples of the baked products also can be puff bread, such as croissant and pull-apart bread. In a preferred embodiment of the present invention, the typical examples of the baked products are cakes, for example sponge cakes or chiffon cakes. In a preferred embodiment of the present invention, the examples of the baked products also can be Chinese snacks with a relatively high oil content, such as moon cake.

In a preferred embodiment of the present invention, due to the use of the process of the present invention, the usage amount of edible fat and oil in the dough can be reduced by at least 15%, for example at least 20%, preferably at least 25%, at least 30%, at least 35%, or more preferably at least 40% by weight relative to that under the same condition except for the absence of maltose α-amylase or the enzyme composition of maltose α-amylase and cellulase.

In a preferred embodiment of the present invention, when preparing toast, since the usage amount of edible fat and oil generally accounts for about 10% by weight of that of flour during the preparation of currently general commercially available toast, using the process of the present invention, the usage amount of edible fat and oil can be reduced to about 6% by weight of that of flour, that is to say, the usage amount of edible fat and oil in the dough can be reduced by 40%. However, if the usage amount of fat and oil only is reduced by about 25%, it is also entirely feasible.

In a preferred embodiment of the present invention, when preparing pull-apart bread, since the usage amount of edible fat and oil generally accounts for about 25% by weight of that of flour during the preparation of currently general commercially available toast, using the process of the present invention, the usage amount of edible fat and oil in the dough can be reduced by at least 15%, at least 20%, preferably at least 25%, at least 30%, at least 35%, or more preferably at least 40% by weight during the preparation process relative to the usage amount of edible fat and oil under the same condition except for the absence of the treatment by the enzyme.

In a preferred embodiment of the present invention, the prepared baked product (for example at day 4, day 7 or day 14) has a lower hardness value and/or higher elasticity value compared with the prepared baked product under the same condition except for not adding maltose amylase or the enzyme composition of maltose α-amylase and cellulase into the dough and not reducing the usage amount of edible fat and oil.

In a preferred embodiment of the present invention, the sensory evaluation of the prepared baked product does not worsen or substantially worsen compared with the prepared baked product under the same condition except for not adding maltose amylase or the enzyme composition of maltose α-amylase and cellulase into the dough and not reducing the usage amount of edible fat and oil. Preferably, for bread, the sensory evaluation is the comprehensive evaluation of touch softness, bread crumb structure, taste softness and taste moisture. More preferably, the sensory evaluation also comprises the evaluation of olfactory fragrance and gustatory aroma.

In a preferred embodiment of the present invention, although it significantly reduces the usage amount of edible fat and oil, the prepared baked product has a shelf life of at least 4 days, or at least 7 days or at least 14 days.

In a preferred embodiment of the present invention, the baked product prepared in the present invention has an improved shelf life, the shelf life thereof is at least 4 days, 5 days, 6 days, 7 days, 8 days, 9 days, 10 days, 11 days, 12 days, 13 days, 14 days, 15 days, 16 days, 17 days, 18 days, 19 days, 20 days or 21 days.

The shelf life can be measured as follows: comparing the baked product prepared by the process of the present invention and the control baked product (i.e. compared with that under the same condition except for not adding the enzymes into the dough and not reducing the usage amount of edible fat and oil); measuring the hardness of the baked product by a texture analyzer, and comparing it with that of the control baked product stored under the same condition. The improved shelf life is defined as the baked product which is not as hard as (i.e. softer than) the control when being measured by a texture analyzer.

Maltose α-Amylase

Maltose α-amylase is an enzyme classified in EC3.2.1.133. The enzymatic activity does not need the non-reducing terminus of the substrate. The main enzymatic activity results in that amylopectin and amylose are degraded to maltose or a relatively long maltodextrin. The enzyme can hydrolyze amylopectin and amylose to maltose in alpha-configuration, and can also hydrolyze maltotriose and cyclodextrin.

In a preferred embodiment of the present invention, maltose α-amylase is selected from the group consisting of:
  (a) a polypeptide, which comprises or consists of the amino acid sequence shown by SEQ ID NO: 1, SEQ ID NO: 2 and/or SEQ ID NO: 3;
  (b) a polypeptide, which is derived from (a) by substituting, deleting or adding one or more amino acids in the amino acid sequence of (a);
  (c) a polypeptide, having at least 80% sequence identity to the amino acid sequence shown by SEQ ID NO: 1, SEQ ID NO: 2 or SEQ ID NO: 3.

In a preferred embodiment of the present invention, the maltose α-amylase provided by the present invention is the polypeptide comprising the amino acid sequence shown by SEQ ID NO: 1, SEQ ID NO: 2 or SEQ ID NO: 3, and a modified polypeptide or homologous polypeptide thereof.

In a preferred embodiment of the present invention, for example, "the polypeptide comprising the amino acid sequence shown by SEQ ID NO: 1, SEQ ID NO: 2 or SEQ ID NO: 3" comprises the polypeptide consisting of the amino acid sequence shown by SEQ ID NO: 1, SEQ ID NO: 2 or SEQ ID NO: 3, the polypeptide constituted by adding a signal peptide sequence into the amino acid sequence shown by SEQ ID NO: 1, SEQ ID NO: 2 or SEQ ID NO: 3, and the polypeptide obtained by adding an appropriate marker sequence at the N-terminus and/or C-terminus of the amino acid sequence shown by SEQ ID NO: 1, SEQ ID NO: 2 or SEQ ID NO: 3.

The "modified polypeptide" in the present invention refers to the protein which comprises the amino acid sequence obtained by deleting, substituting, inserting or adding one or more amino acids in the amino acid sequence show by SEQ ID NO: 1, SEQ ID NO: 2 or SEQ ID NO: 3 and has the maltose α-amylase activity.

In a preferred embodiment of the present invention, the modification of the amino acid in said modified polypeptide or homologous polypeptide thereof is a "conservative modification". For example, "conservative substitution" refers to substituting one or more amino acid residues with other chemically similar amino acids without substantially changing the protein activity. Examples are a case in which a hydrophobic residue is substituted by other hydrophobic residues and a case in which a polar residue is substituted by other polar residues having the same charge.

A similarly functional amino acid which can be subjected to such a conservative substitution is well known in the corresponding art of each amino acid. Specifically, as a non-polar (hydrophobic) amino acid, examples are alanine, valine, isoleucine, leucine, proline, tryptophan, phenylalanine, methionine and the like. As a polar (neutral) amino acid, examples are glycine, serine, threonine, tyrosine, glutamic acid, aspartic acid, cysteine and the like. As a positively charged (basic) amino acid, examples are arginine, histidine, lysine and the like. In addition, as a negatively charged (acidic) amino acid, examples are aspartic acid, glutamic acid and the like.

In one aspect, the maltose α-amylase according to the present invention differs by no more than 10 amino acids, e.g., 1, 2, 3, 4, 5, 6, 7, 8, 9 or 10 amino acids from the amino acids of SEQ ID NO: 1, SEQ ID NO: 2 or SEQ ID NO: 3.

The "homologous polypeptide" of the present invention refers to comprise an amino acid sequence having at least 80%, at least 85%, at least 90%, at least 91%, at least preferably 92%, at least preferably 93%, at least preferably 94%, at least preferably 95%, at least preferably 96%, at least preferably 97%, at least preferably 98%, at least preferably 99%, more preferably 100% homology (sequence identity) to the amino acid sequence shown by SEQ ID NO: 1, SEQ ID NO: 2 or SEQ ID NO: 3.

For purposes of the present invention, the sequence identity between two amino acid sequences is determined by using the Needleman-Wunsch algorithm (Needleman and Wunsch, 1970, J. Mol. Biol. 48: 443-453) which is implemented in the Needle program of the EMBOSS package (EMBOSS: The European Molecular Biology Open Software Suite, Rice et al., 2000, Trends Genet. 16: 276-277), preferably version 3.0.0 or later. The optional parameters used are gap open penalty of 10, gap extension penalty of 0.5, and the EBLOSUM62 (EMBOSS version of BLOSUM62) substitution matrix. The output of Needle labeled "longest identity" (obtained using the -nobrief option) is used as the percent identity and is calculated as follows:
(Identical Residues×100)/(Length of Alignment—Total Number of Gaps in Alignment)

The polypeptide of the present invention may be natural, synthetic, semi-synthetic, or recombinantly produced. The polypeptide of the present invention can be produced by genetic engineering, by known peptide synthesis or by digesting the polypeptides of the present invention with appropriate peptidases. Preferably, the polypeptide of the present invention may a polypeptide product produced and encoded by the recombinant DNA sequence in the host cell according to a bioengineering method, also may be synthesized according to solid phase or liquid phase chemical technique, for example, it may be synthesized according to the method described by Steward and Young (Steward, J. M. and Young, J. D., Solid Phase Peptide Synthesis, 2nd Ed., Pierce Chemical Company, Rockford, Ill., (1984)) using an Applied Biosystem synthesizer or a Pioneer™ peptide synthesizer according to solid phase chemical technique.

In a preferred embodiment of the present invention, the maltose α-amylase is derived from the genus *Bacillus*, especially those derived from *Bacillus lichenformis, Bacillus stearothermophilus* or *Bacillus amyloliquefaciens*. The term "derived from" refers to it can be generated or expressed in the original wild type strain and another strain, i.e. the term encompasses the expression of wild type and naturally generated proteins, and the expression of any recombinant, genetically engineered or synthases in the host.

The maltose α-amylase can be the maltose α-amylase as disclosed in e.g., WO 1999/043794, WO 2006/032281, or WO 2008/148845 or the variants of the enzyme.

Suitable commercial maltose α-amylases comprise Novamyl, OPTICAKE 50 BG, Novamyl Boost and Novamyl 3D (obtainable from Novozymes A/S).

In a preferred embodiment of the present invention, the "maltose α-amylase" added into a dough comprises the maltose α-amylase shown by SEQ ID NO: 1, SEQ ID NO: 2 or SEQ ID NO: 3, or a modified polypeptide or homologous polypeptide thereof or a mixture thereof.

In a preferred embodiment of the present invention, the "maltose α-amylase" added into a dough is a mixture comprising the maltose α-amylase shown by SEQ ID NO: 1, SEQ ID NO: 2 and/or SEQ ID NO: 3, such as a mixture comprising the maltose α-amylase shown by SEQ ID NO: 2 and/or SEQ ID NO: 3.

In a preferred embodiment of the present invention, the "maltose α-amylase" added into a dough comprises 10%-95% (w/w) of the maltose α-amylase shown by SEQ ID NO: 2 and 90%-5% (w/w) of the maltose α-amylase shown by SEQ ID NO: 3, preferably comprises 20%-95% (w/w) of the maltose α-amylase shown by SEQ ID NO: 2 and 80%-5% (w/w) of the maltose α-amylase shown by SEQ ID NO: 3, preferably comprises 30%-95% (w/w) of the maltose α-amylase shown by SEQ ID NO: 2 and 70%-5% (w/w) of the maltose α-amylase shown by SEQ ID NO: 3, preferably comprises 40%-95% (w/w) of the maltose α-amylase shown by SEQ ID NO: 2 and 60%-5% (w/w) of the maltose α-amylase shown by SEQ ID NO: 3, preferably comprises 50%-95% (w/w) of the maltose α-amylase shown by SEQ ID NO: 2 and 50%-5% (w/w) of the maltose α-amylase shown by SEQ ID NO: 3, preferably comprises 60%-95% (w/w) of the maltose α-amylase shown by SEQ ID NO: 2 and 40-5% (w/w) of the maltose α-amylase shown by SEQ ID NO: 3, preferably comprises 70%-95% (w/w) of the maltose α-amylase shown by SEQ ID NO: 2 and 30%-5% (w/w) of the maltose α-amylase shown by SEQ ID NO: 3, preferably comprises 80%-95% (w/w) of the maltose α-amylase shown by SEQ ID NO: 2 and 20%-5% (w/w) of the maltose α-amylase shown by SEQ ID NO: 3, and preferably comprises 90%-95% (w/w) of the maltose α-amylase shown by SEQ ID NO: 2 and 10%-5% (w/w) of the maltose α-amylase shown by SEQ ID NO: 3.

The amount of the maltose α-amylase generally in the range of 1-1500 ppm, preferably 10-100 ppm per kilogram of flour. Calculated by the enzymatic activity, the additive amount of the maltose α-amylase preferably is 10-1000 MANU/kg flour, such as 50-500 MANU/kg. In a preferred embodiment of the present invention, one ppm maltose amylase corresponds to about 2.7 MANU of the enzymatic activity. One MANU (maltose amylase Novo unit) can be defined as the amount of enzyme required to release 1 mol maltose per minute in 30 minutes at the substrate concentration of 10 mg maltotriose (Sigma M 8378) in 0.1 M citrate buffer per milliliter at 37° C. and pH 5.0.

Cellulases

As used herein, it should be understood that the term "cellulases" comprises the enzyme composition or enzyme mixture of cellulases, especially endoglucanases (EC 3.2.1.4).

In one embodiment, the used cellulases according to the present invention is the enzyme composition comprising endoglucanases (EC 3.2.1.4).

The cellulases may comprise a carbohydrate-binding module (CBM) which enhances the binding of the enzyme to a cellulose-containing fiber and increases the efficacy of the catalytic active part of the enzyme. A CBM is defined as contiguous amino acid sequence within a carbohydrate-active enzyme with an independent fold having carbohydrate-binding activity. For further information on CBMs, see, e.g., the CAZy internet server or Tomme et al., 1995, in Enzymatic Degradation of Insoluble Polysaccharides (Saddler & Penner, eds.), Cellulose-binding domains: classification and properties. pp. 142-163, American 25 Chemical Society, Washington.

Endoglucanases (E.C. 3.2.1.4) catalyze endo hydrolysis of 1,4-beta-D-glycosidic linkages in cellulose, cellulose derivatives (such as carboxy methyl cellulose and hydroxy ethyl cellulose), lichenin, β-1,4 bonds in mixed β-1,3 glucans such as cereal β-D-glucans or xyloglucans and other plant material containing cellulosic parts.

The endoglucanase activity can be determined according to the procedure of Ghose, 1987, Pure and Appl. Chem. 59: 257-268, such as by the hydrolysis of carboxymethylcellulose (CMC).

In addition to endoglucanase, the cellulase mixture also can comprises cellobiohydrolase (E.C.3.2.1.91) and/or β-glucosidase (E.C.3.2.1.21), especially cellobiohydrolase.

Cellobiohydrolase catalyzes the hydrolysis of 1,4-β-D-glucosidic linkages in cellulose, cellooligosaccharides, or any β-1,4-linked glucose containing polymer, releasing cellobiose from the reducing or non-reducing ends of the chain.

The examples of cellobiohydrolase comprise CBH I and CBH II from *Trichoderma reesei*.

In some embodiments, the cellulase or cellulase mixture can be derived from a strain of the genus *Trichoderma*, such as a strain of *Trichoderma reesei*, or a strain of the genus *Humicola*, such as a strain of *Humicola insolens*, or a strain of the genus *Aureosporium*, preferably a strain of *Chrysosporium lucknowense*.

In some embodiments, the enzyme composition for use in the method and/or use of the present invention can be the product (such as fermentation product) of expressing one or more enzymes in a suitable host cell.

Preferably, cellulase composition can be obtained from (for example, obtained from) genus *Trichoderma*, preferably obtained from *Trichoderma reesei*.

The example of commercial cellulase product produced by *Trichoderma reesei* is Celluclast BG™ and is obtainable from Novozymes A/S.

The cellulase can be applied at an additive amount of an effective amount, for example, based on per kilogram of flour, at least 0.5 ppm, at an amount in a range of 0.5-5000 ppm, preferably, the usage amount of the cellulase can be in a range of 1-10 ppm, but it can be added as required.

Phospholipase

Phospholipase can have the activity of phospholipases A1, A2, B, C, D or lysophospholipase, and it may have or may not have lipase activity. It may be of animal origin, e.g., from pancreas, snake venom or bee venom, or it may be of microbial origin, e.g., from filamentous fungi, yeast or bacteria, such as *Aspergillus* or *Fusarium*, e.g., *A. niger, A. oryzae* or *F. oxysporum*. A preferred lipase/phospholipase from *Fusarium oxysporum* is disclosed in WO 98/26057. Also, the variants described in WO 00/32758 may be used.

Suitable phospholipase compositions are LIPOPAN F™ and LIPOPAN XTRA™ (obtainable from Novozymes A/S) or PANAMORE GOLDEN™ and PANAMORE SPRING™ (obtainable from DSM).

For example, suitable commercial lipase preparation is LIPOPAN™, for example, LIPOPAN™ 50 BG which is obtainable from Novozymes A/S.

Additional Enzymes

Optionally, additional Enzymes, such as amylase, alpha-amylase, 0-amylase, fungal alpha-amylase, carboxypeptidase, catalase, lipolytic enzyme, galactanase, alpha-galactosidase, 0-galactosidase, glucanase, glucoamylase, glucose oxidase, lipase, oxidase, peroxidase, phytase, polyphenoloxidase, protease and/or xylanase can be used with the enzymes related to the process according to the present invention.

Dough

The present invention also relates to methods for preparing a dough or baked product, these methods comprises incorporating an effective amount of an enzyme to control or reduce the usage amount of edible fat and oil in the preparation process of a baked product.

Phrase "incorporating" is defined herein as adding the related materials according to the present invention into a dough, into any ingredients of a dough to be made, and/or into any mixture of dough ingredients of a dough to be made.

In other words, the baking composition of the present invention can be added in any steps of the dough preparation, and can be added in one, two, or more steps. The composition can be added into the dough ingredients for kneading and baking by using a method well known in the art.

Term "effective amount" is defined herein as according to the preparation requirement of a baked product, which is sufficient to provide a measurable effect on at least one property of interest of a dough and/or baked product.

Term "dough" is defined herein as a mixture of flour and other ingredients, and the dough is hard enough for kneading or rolling.

The dough of the present invention can comprise flour derived from any grains, including wheat, barley, rye, oat, corn, sorghum, rice, millet, and any mixture thereof.

In a preferred embodiment of the present invention, the dough also comprises the group consisting of: flour, yeast, edible salt, edible sugar, vitamin C and/or edible essence. Preferably, in consideration of the significant reduction in the usage amount of edible fat and oil, although the prepared baked product has no changes or substantial changes in terms of touch softness, bread crumb structure, taste softness and taste moisture, an appropriate amount of edible essence can be added to make up for the partial change of the olfactory fragrance and/or gustatory aroma caused by the massive reduction in the usage amount of edible fat and oil. Especially, since margarine can contain edible essence, this part of edible essence and the reduction in the usage amount of edible fat and oil may have some effects on the odor, especially the odor after the storage, in preferred embodiment of the present invention, this can be made up for by adding an appropriate amount of edible essence.

The dough also can contain other dough ingredients, such as protein, such as milk powder, gluten and soybean; egg (whole egg, yolk or egg white); oxidants, such as ascorbic acid, potassium bromate, potassium iodate, azodicarbonamide (ADA) or ammonium persulfate; amino acids, such as L-cysteine; starch; and/or salts, such as sodium chloride, calcium acetate, sodium sulfate, calcium propionate or calcium sulfate.

Starch can be wheat starch, corn starch, maize starch, tapioca starch, cassava starch, potato starch; and/or sugar, such as sucrose, cane sugar, lactose or high fructose corn syrup.

In the present invention, the edible fats and oils are natural fats and oils or reprocessed fats and oils, wherein, for example, the natural fats and oils are vegetable fats and oils and animal fats and oils, for example vegetable oils or butters, wherein the vegetable oils for example, are rapeseed oils or soybean oils, and for example, the reprocessed fats and oils are margarine, shortening, non-dairy cream etc.

In some embodiments of the present invention, for some applications, it does not need emulsifiers; but for some applications, it may need emulsifiers. The emulsifiers suitable for the present invention preferably are emulsifiers selected from the group consisting of: diacetyl tartaric acid esters of monoglycerides (DATEM), sodium stearyl lactate (SSL), calcium stearyl lactate (CSL), ethoxylated mono and diglycerides (EMG), distilled monoglycerides (DMG), polysorbate (PS), and succinylated monoglycerides (SMG).

The dough of the present invention can be fresh, frozen or partially baked (pre-baked).

The dough of the present invention is generally a fermented dough or a dough to be subjected to fermentation. The dough can be fermented in a variety of ways, such as fermenting the dough by adding a chemical starter (e.g., sodium bicarbonate) or by adding a starter (fermented dough), but preferably by adding a suitable yeast culture such as *Saccharomyces cerevisiae* (bread yeast) culture (such as a commercially available *Saccharomyces cerevisiae* strain).

The present invention also relates to a baking fat and oil for baking, comprising edible fat and oil, cellulase and at least one maltose α-amylase, and preferably, the fat and oil also contains an emulsifier and/or antioxidant. When preparing a baked product from a dough by using the baking fat and oil, due to the addition of cellulase and at least one maltose α-amylase, the usage amount of edible fat and oil in the preparation process can be reduced by at least 10% by weight relative to that under the same condition except for not adding the enzymes into the baking fat and oil, and preferably, in the prepared baked product, the content of the edible fat and oil is at least 1% (w/w), for example at least 2% (w/w), preferably at least 3% (w/w) relative to the baked product.

In some embodiments of the present invention, the edible fats and oils contained in the fats and oils for baking are vegetable oils, for example rapeseed oil, soybean oil, beef tallow, cream, coconut oil or palm kernel oil. Preferably, in the fats and oils for baking, the emulsifier is at least one of fatty acid glycerides, span 60, polyglyceryl esters, sucrose esters and sodium stearyl lactates.

Industrial Process

The present invention is particularly useful for preparing a dough and baked product in an industrialized process, wherein the dough for preparing the baked product is prepared in a mechanistic way by using automated or semi-automated equipment.

The process for preparing bread generally relates to following sequential steps: making dough (and optional proofing step), sheeting or dividing, shaping or rolling, and proofing the dough, these steps are well known in the art.

If using the optional proofing step, then preferably adding more flour and can add a base to neutralize the acid generated in this step or to be generated in the second proofing step. In the production process of industrial baking according to the present invention, one or more of these steps are carried out by using automated or semi-automated equipment.

The invention described and claimed herein is not limited to the scope of the specific embodiments disclosed herein, and these embodiments are only illustrative of several aspects of the invention.

Embodiment 1: Use of Enzyme for Reducing Oil in Toast

Direct dough fermentation process was used for preparing toast, wherein all used raw materials were at food grade, fungal amylase was Fungamyl 2500 SG, xylanase was Pentopan Mono BG, glucose oxidase was Gluzyme Mono 10000BG, cellulase was Celluclast BG, all were commercial products of Novozymes A/S, and maltose amylase (the compounding of SEQ ID NO: 2 and SEQ ID NO: 3) was derived from *Bacillus stearothermophilus*.

According to the ingredients list of table 1 and the protocol of table 2, flour, edible salt, sucrose, yeast, calcium propionate, SSL, CSL, and DMG were weighed and added into a flour cylinder (a vertical stirring and kneading machine, DIOSNA brand), enzymes, water and milk flavor were added and stirred, and the water temperature was adjusted such that the temperature of the dough was maintained at 23° C. after being mixed. Artificial butter was added, the mixture was stirred continuously until the gluten was extended. The made dough was standing for 10 min, then the dough was divided at 450 g/dough. The divided doughs were stood for 10 min after being preliminarily shaped, then were further shaped twice by a pressing and shaping machine. The dough was placed into a mould, then was placed into a proofing box and proofed for 120 min at the proofing temperature of 35° C. and the proofing humidity of 85%. The proofed dough was placed into a oven for baking, the oven temperature (broiling 185° C., baking 185° C.). The baked toast was cooled and prepared into a product.

TABLE 1

Recipe of raw materials

| Recipe | Baking percentage % (based on flour) |
| --- | --- |
| Pengtai wheat flour (Bimbo toast slice flour) | 100 |
| Water | 68 |
| Yeast (Angel high activity dry yeast) | 1.2 |
| Sucrose | 15 |
| Artificial butter (Namchow vege bake margarine) | 6 or 10 |
| Edible salt | 1 |
| Vitamin C | 0.01 |
| Calcium propionate (Madale) | 0.2 |
| Sodium stearyl lactate (Henan Zhengtong, SSL6425) | 0.125 |
| Calcium stearyl lactate (Henan Zhengtong, CSL6024) | 0.125 |
| Molecular distilled monoglyceride (DuPont, PH200) | 0.2 |
| Maxim milk flavor (W1310456) | 0.098 |
| Basal enzymes | Xylanase (30 ppm), fungal amylase (12 ppm), glucose oxidase (30 ppm) |
| Oil reducing enzymes | 60 ppm |

TABLE 2

Protocol

| Batch | Usage amount of fat and oil | Maltose amylase | Cellulases |
| --- | --- | --- | --- |
| A | 10% | 0 ppm | 0 ppm |
| B | 6% | 0 ppm | 0 ppm |
| C | 6% | 60 ppm | 0 ppm |
| D | 6% | 55 ppm | 5 ppm |

Method for determining hardness: The toast was divided by using a toast slicer (the thickness of each bread slice was 1.2 cm), two sliced bread slices were in one group (the thickness was 2.4 cm), and were determined by a TA.XT Plus texture analyzer. Gram was used as the unit, the higher the hardness value, represented that the bread softness of the prepared bread was lower, and the quality was poorer.

Method for determining elasticity: The toast was divided by using a toast slicer (the thickness of each bread slice was 1.2 cm). Two sliced bread slices were in one group (the thickness was 2.4 cm), and were determined by a TA.XT Plus texture analyzer. % was used as the unit. The higher the elasticity value, represented that the quality of the prepared bread was better.

Sensory evaluation: Touch softness, bread crumb structure, olfactory fragrance, taste softness, taste moisture, and gustatory aroma of above-mentioned each batch of prepared toasts were scored by 5 skilled test baker (the bread prepared in batch A was scored 5.0 points and used as the baseline, the score which was not less than 4.0 represented that it did not substantially worsen). The mean was taken for a comprehensive evaluation, wherein the higher the score of the mean, represented that the quality of the prepared bread was better.

The total sensory evaluation of each batch of prepared breads at 24 hours after being prepared (i.e. day 1) was: the mean of batch A was 5.0 points, the mean of batch B was 4.8 points, the mean of batch C was 5.2 points, and the mean of batch D was 5.3 points; and the sensory evaluation of each batch of prepared breads at 336 hours after being prepared (i.e. day 14) was: the mean of batch A was 5.0 points, the mean of batch B was 4.2 points, the mean of batch C was 5.4 points, and the mean of batch D was 5.6 points.

It can be seen that in the preparation process of toast, although the usage amount of edible fat and oil was greatly reduced (the usage amount was reduced 40%), the preparation cost of bread was greatly saved and the fat and oil content was greatly reduced. However, due to the addition of the maltose amylase, the sensory evaluation of the prepared bread did not worsen relative to the reference solution, even was improved to some extent, wherein when maltose amylase and cellulase were added into the dough, the sensory evaluation of the prepared bread was better, so there is a kind of synergistic effect between maltose amylase and cellulase.

In addition, it can be known from table 3 bellow, compared with the product of batch A as the control, when the usage amount of edible fat and oil in the preparation process was reduced from 10% to 6% based on the flour weight, the elasticity value of the prepared toast was relatively good, but the hardness value was significantly higher. However, under the same low level of usage amount of fat and oil, the bread prepared by adding maltose amylase into the dough exhibited very excellent softness and elasticity. Especially, when maltose amylase and cellulase were added into the dough, the hardness value of the prepared bread was the lowest. All toast prepared by a method related to an enzymatic method exhibited more obvious advantages in terms of softness and elasticity as the storage time of the breads was increasing. For example, the quality at day 14 of the bread prepared in batch C was better than the level at day 7 of the bread prepared in batch A, and the texture at day 14 of the bread prepared in batch D was obviously better than the level at day 7 of the bread prepared in batch A, especially raising the softness while maintaining a very good elasticity.

TABLE 3

| | Day 1 | Day 4 | Day 7 | Day 14 |
|---|---|---|---|---|
| Batch | (Hardness/elasticity) | (Hardness/elasticity) | (Hardness/elasticity) | (Hardness/elasticity) |
| A | 220.23 g/60.21% | 352.50 g/54.26% | 454.36 g/55.10% | 619.74 g/51.59% |
| B | 288.12 g/61.01% | 481.42 g/56.91% | 550.97 g/55.48% | 748.71 g/52.94% |
| C | 222.63 g/63.01% | 311.68 g/59.44% | 332.54 g/58.63% | 437.75 g/58.86% |
| D | 209.36 g/62.93% | 303.97 g/60.96% | 308.20 g/60.25% | 404.84 g/59.66% |

Hardness and elasticity of products of each batch

It suggests that in the preparation process of toast with a relatively high oil content, by adding maltose amylase into a dough, preferably complex cellulase, it can ensure that the overall evaluation of key indicators of the prepared toast did not worsen or substantially worsen, while the usage amount of edible fat and oil in the preparation was greatly reduced, which not only reduced preparation cost of the baked product greatly, but also can significantly reduce the usage amount of edible fat and oil in the preparation process, therefore the prepared baked product also was more aligned with the concept of healthy food.

Embodiment 2: Use of Enzyme for Reducing Oil in Toast

Direct dough fermentation process was used for preparing toast, wherein all used raw materials were at food grade, fungal amylase was Fungamyl 2500 SG, xylanase was Pentopan Mono BG, glucose oxidase was Gluzyme Mono 10000BG, cellulase was Celluclast BG, all were commercial products of Novozymes A/S, and maltose amylase (SEQ ID NO: 1 or SEQ ID NO: 2), were all derived from *Bacillus stearothermophilus*.

According to the ingredients list of table 4 and the protocol of table 5, flour, edible salt, sucrose, yeast, calcium propionate, SSL, CSL, and DMG were weighed and added into a flour cylinder (a vertical stirring and kneading machine, DIOSNA brand), enzymes, water and milk flavor were added and stirred, and the water temperature was adjusted such that the temperature of the dough was maintained at 23° C. after being mixed. Artificial butter was added, the mixture was stirred continuously until the gluten was extended. The made dough was standing for 10 min, then the dough was divided at 450 g/dough. The divided doughs were stood for 10 min after being preliminarily shaped, then were further shaped twice by a pressing and shaping machine. The dough was placed into a mould, then was placed into a proofing box and proofed for 120 min at the proofing temperature of 35° C. and the proofing humidity of 85%. The proofed dough was placed into a oven for baking, the oven temperature (broiling 185° C., baking 185° C.). The baked toast was cooled and prepared into a product.

TABLE 4

Recipe of raw materials

| Recipe | Baking percentage % (based on flour) |
|---|---|
| Pengtai wheat flour (Bimbo toast slice flour) | 100 |
| Water | 62 |
| Yeast (Angel high activity dry yeast) | 1.2 |
| Sucrose | 15 |
| Artificial butter (Namchow vege bake margarine) | 6 or 10 |
| Edible salt | 1 |
| Vitamin C | 0.01 |
| Calcium propionate (Madale) | 0.2 |
| Sodium stearyl lactate (Henan Zhengtong, SSL6425) | 0.125 |
| Calcium stearyl lactate (Henan Zhengtong, CSL6024) | 0.125 |
| Molecular distilled monoglyceride (DuPont, PH200) | 0.2 |
| Maxim milk flavor (W1310456) | 0.098 |
| Basal enzymes | Xylanase (30 ppm), fungal amylase (12 ppm), glucose oxidase (30 ppm) |
| Oil reducing enzymes | 60 ppm |

TABLE 5

Protocol:

| Batch | Usage amount of fat and oil % | Maltose amylase (SEQ ID NO: 2)/ ppm | Maltose amylase (SEQ ID NO: 1)/ ppm | Cellulase Celluclast BG/ppm |
|---|---|---|---|---|
| A | 10 | 0 | 0 | 0 |
| B | 6 | 60 | 0 | 0 |
| C | 6 | 55 | 0 | 5 |
| D | 6 | 0 | 60 | 0 |

According to the parameter characterization method in embodiment 1, sensory evaluation was performed on each batch of prepared breads at 24 hours (i.e. day 1), 96 hours (i.e. day 4), 168 hours (i.e. day 7), and 336 hours (i.e. day 14) after being prepared, as shown in table 6:

TABLE 6

Sensory evaluation of each batch of breads

| Batch | Day 1 | Day 4 | Day 7 | Day 14 |
|---|---|---|---|---|
| A | 5.0 | 5.0 | 5.0 | 5.0 |
| B | 5.1 | 5.4 | 5.5 | 5.6 |
| C | 5.3 | 5.4 | 5.5 | 5.6 |
| D | 5.2 | 5.2 | 5.4 | 5.3 |

It can be seen that in the preparation process of toast, although the usage amount of edible fat and oil was greatly reduced (the usage amount was reduced 40%), the preparation cost of bread and the fat and oil content were greatly saved. However, due to the addition of the maltose amylase (SEQ ID NO: 1 or SEQ ID NO: 2), the sensory evaluation of the prepared bread did not worsen relative to the reference solution, even was improved to some extent.

In addition, it can be known from table 7 bellow, compared with the product of batch A as the control, under the low level of usage amount of fat and oil, the bread prepared by adding maltose amylase into the dough exhibited very excellent softness and elasticity at day 1 and day 14, wherein when maltose amylase and cellulase were added into the dough, the sensory evaluation of the prepared bread was better, so there is a kind of synergistic effect between maltose amylase and cellulase. The evaluation spanning 14 days is sufficient for short-shelf life breads such as toast to suggest that by adding maltose amylase into a dough, it can ensure that the overall evaluation of key indicators of the prepared toast did not worsen or substantially worsen, or even can be improved, while the usage amount of edible fat and oil in the preparation was greatly reduced.

TABLE 7

Hardness and elasticity of products of each batch

| Batch | Day 1 (Hardness/elasticity) | Day 14 (Hardness/elasticity) |
| --- | --- | --- |
| A | 169.15 g/61.85% | 484.00 g/50.71% |
| B | 162.98 g/65.98% | 265.94 g/64.11% |
| C | 160.64 g/65.67% | 238.01 g/63.81% |
| D | 150.61 g/65.61% | 382.80 g/58.95% |

Embodiment 3: Use of Enzyme for Reducing Oil in French Roll

Direct dough fermentation process was used for preparing toast, wherein all used raw materials were at food grade, fungal amylase was Fungamyl 2500 SG, xylanase was Pentopan Mono BG, glucose oxidase was Gluzyme Mono 10000BG, cellulase was Celluclast BG, all were commercial products of Novozymes A/S, and maltose amylase (the compounding of SEQ ID NO: 2 and SEQ ID NO: 3) was derived from *Bacillus stearothermophilus*.

According to the following ingredients list of table 8, flour, edible salt, sucrose, yeast, CSL and sodium dehydroacetate materials were weighed and added into a flour cylinder (a vertical stirring and kneading machine, DIOSNA brand), mixed uniformly, eggs, syrup, water and enzymes were added and stirred, shortening was added, the mixture was stirred until the gluten was extended, and the temperature of the dough was maintained at 23° C. The dough was divided at 200 g/dough, then pressed 30 times until the gluten is complete. The dough was rolled, divided at 25 g/dough, placed into a mould, then was placed into a proofing box and proofed for 90 min at the proofing temperature of 35° C. and the proofing humidity of 85%. The proofed dough was placed into a oven for baking, the oven temperature (broiling 200° C., baking 155° C.), and the baking temperature is 10 min. The baked French roll was cooled and packaged.

TABLE 8

Recipe of raw materials

| Recipe | Baking percentage % (based on flour) |
| --- | --- |
| Pengtai wheat flour | 100 |
| Water | 35 |

TABLE 8-continued

Recipe of raw materials

| Recipe | Baking percentage % (based on flour) |
| --- | --- |
| Eggs | 10 |
| Yeast (Angel high activity dry yeast) | 1.5 |
| Sucrose | 20 |
| Shortening (Nanqiao Kinsco sheet margarine) | 12.5 |
| Fructose-glucose syrup F42 (Henan Feitian) | 3 |
| Edible salt | 0.8 |
| Full cream formulated milk powder (Nestlé) | 5 |
| Vitamin C | 100 ppm |
| Sucrose esters (Henan Wanbang) | 0.08 |
| Calcium stearyl lactate (Henan Zhengtong, CSL6024) | 0.08 |
| Sodium dehydroacetate (Madale) | 0.1 |
| Basal enzymes | Xylanase (30 ppm), fungal amylase (12 ppm), glucose oxidase (30 ppm) |
| Compounded oil reducing enzymes | Maltose amylase and cellulase |

TABLE 9

Protocol

| Batch | Shortening % | Maltose amylase/ppm | Cellulase/ppm |
| --- | --- | --- | --- |
| A | 12.5 | 0 | 0 |
| B | 8 | 0 | 0 |
| C | 8 | 94 | 6 |

Sensory evaluation: touch softness, tactile elasticity, bread crumb structure, olfactory fragrance, taste softness, taste moisture, and gustatory aroma of above-mentioned each batch of prepared French rolls were scored by 5 skilled test baker (the roll prepared in batch A was scored 5.0 points and used as the baseline). The mean was taken for a comprehensive evaluation, wherein the higher the score of the mean, represented that the quality of the prepared roll was better.

Sensory evaluation was performed on each batch of prepared French rolls at 24 hours (i.e. day 1), 72 hours (i.e. day 3), 336 hours (i.e. day 14), 504 hours (i.e. day 21) and 672 hours (i.e. day 28) after being prepared:

TABLE 10

Sensory evaluation of each batch of breads

| | Batch A | Batch B | Batch C |
| --- | --- | --- | --- |
| Day 1 | 5.0 | 4.7 | 4.9 |
| Day 3 | 5.0 | 4.7 | 5.0 |
| Day 14 | 5.0 | 4.8 | 5.1 |
| Day 21 | 5.0 | 4.9 | 5.1 |
| Day 28 | 5.0 | 4.7 | 5.3 |

As shown in table 10 above, in the preparation process of French roll, although the usage amount of the shortening was greatly reduced (the usage amount was reduced 36%), the preparation cost of bread was saved. However, due to the addition of the compounded oil reducing enzyme of maltose amylase and cellulase, the sensory evaluation of the prepared bread did not worsen, even was improved to some extent. The evaluation spanning 28 days is sufficient for middle-shelf life breads such as French roll to suggest that in the preparation process of French roll with a relatively high oil content, by adding maltose amylase into a dough, preferably complex cellulase, it can ensure that the overall evaluation of key indicators of the prepared toast did not worsen or substantially worsen, while the usage amount of edible fat and oil in the preparation was greatly reduced, which not only reduced preparation cost of the baked product greatly, but also can significantly reduce the usage amount of edible fat and oil in the preparation process, therefore the prepared baked product also was more aligned with the concept of healthy food.

Embodiment 4: Use of Enzyme for Reducing Oil in Sponge Cake

Whole egg stirring process was used for preparing sponge cake, wherein all used raw materials were at food grade.

According to the ingredients list of table 11 and the protocol of table 12, calcium propionate, baking soda, whole milk powder, flour and enzyme were mixed and sieved for later use. Eggs, edible sugar, edible salt and enzymes were added to a stirring tank (a vertical stirring tank, DIOSNA brand) and stirred for 2 minutes; all liquid and powder ingredients except oil were added, stirred for 1 minute, the tank was scraped, and the mixture was stirred continuously for 2 minutes; vegetable oil was added, stirred for 1 minute, the tank was scraped, then the batter was poured into a mould at 300 g/portion, placed into a oven for baking, the oven temperature (broiling 180° C., baking 170° C.). The baked cake was cooled and prepared into a product. The used oil reducing enzyme is the compounding of cellulase and maltose amylase, wherein the cellulase is Celluclast BG (commercial products of Novozymes A/S), and maltose amylase (the compounding of SEQ ID NO: 2 and SEQ ID NO: 3) was derived from *Bacillus stearothermophilus*.

TABLE 11

Recipe of raw materials

| Recipe | Baking percentage % (based on batter) |
|---|---|
| Flour (Queen low gluten flour) | 25 |
| Eggs (purchased from Deqingyuan) | 28 |
| Powdered sugar | 27 |
| Vegetable oil (purchased from Golden dragon fish) | 6 or 11 |
| Water | 5 |
| Whole milk powder (purchased from Nestlé) | 1 |
| Edible salt | 0.3 |
| Baking soda (purchased from Puratos) | 0.3 |
| Calcium propionate (Madale) | 0.4 |
| Oil reducing enzymes | 200 ppm |

TABLE 12

Protocol

| Batch | Usage amount of fat and oil | Oil reducing enzymes |
|---|---|---|
| A | 11% | 0 ppm |
| B | 6% | 0 ppm |
| C | 6% | 200 ppm |

Parameter Characterization

Method for determining hardness: The cake was smoothly divided (the height of each cake was 45 cm), and determined by a TA.XT Plus texture analyzer. Gram was used as the unit, the higher the hardness value, represented that the bread softness of the prepared cake was lower, and the quality was poorer.

The ratio of the energy (positive peak area integration under the curve) of the two pressing processes in the texture test was used as the texture of samples to test viscidity. The viscidity reflects the taste quality of the cake. The higher the viscidity, the better the viscidity of the prepared cake and the better the quality.

Sensory evaluation: Taste softness, taste viscidity, taste moisture, and melt-in-the-mouth effect of above-mentioned each batch of prepared cakes were scored by 5 skilled test baker (the cake prepared in batch A was scored 5.0 points and used as the baseline, a gap of 0.5 points represented that there is a substantial quality difference). The mean was taken for a comprehensive evaluation, wherein the higher the score of the mean, represented that the quality of the prepared cake was better.

The total sensory evaluation of each batch of prepared cakes at 72 hours after being prepared (i.e. day 3) was: the mean of batch A was 5 points, the mean of batch B was 3 points, and the mean of batch C was 5 points; each batch of prepared cakes at 168 hours after being prepared (i.e. day 7) was: the mean of batch A was 5 points, the mean of batch B was 4 points, and the mean of batch C was 5.8 points; and each batch of prepared cakes at 360 hours after being prepared (i.e. day 15) was: the mean of batch A was 5 points, the mean of batch B was 4 points, and the mean of batch C was 5.3 points.

It can be seen that in the preparation process of cake, although the usage amount of edible fat and oil was greatly reduced (the usage amount was reduced about 45%), the preparation cost of cake was greatly saved and the fat and oil content was reduced. However, due to the addition of the oil reducing enzyme, the sensory evaluation of the prepared cake did not worsen relative to the reference solution, even was improved to some extent, and the sensory evaluation of the prepared cake was better.

TABLE 13

Sensory evaluation of each batch of products

| Batch | Day 3 (softness/moisture/melt-in-the-mouth effect) | Day 7 (softness/moisture/melt-in-the-mouth effect) | Day 15 (softness/moisture/melt-in-the-mouth effect) |
|---|---|---|---|
| A | 5/5/5 | 5/5/5 | 5/5/5 |
| B | 3/3/3 | 4/4/4 | 4/4/4 |
| C | 5/5/5 | 6/6/5.5 | 5.5/5.5/5 |

In addition, it can be known from table 14 bellow, compared with the product of batch A as the control, when the usage amount of edible fat and oil in the preparation process was reduced from 11% to 6%, the viscidity value of the cake prepared by batch B was relatively good, but the hardness value was significantly higher. However, under the same low level of usage amount of fat and oil, the cake prepared by adding oil reducing enzyme into the formula of cakes exhibited very excellent softness and viscidity. The cake prepared by a method related to an enzymatic method exhibited more obvious advantages in terms of softness and viscidity as the storage time of the cakes was increasing. For example, the texture at day 15 of the cake prepared in batch C was obviously better than the level at day 7 of the cake prepared in batch A, especially raising the softness while raising the viscidity.

TABLE 14

Hardness and viscidity of products of each batch

| Batch | Day 3 (hardness/viscidity) | Day 7 (hardness/viscidity) | Day 15 (hardness/viscidity) |
|---|---|---|---|
| A | 432 g/0.63 | 510 g/0.56 | 597 g/0.52 |
| B | 439 g/0.66 | 579 g/0.59 | 623 g/0.52 |
| C | 319 g/0.75 | 371 g/0.66 | 492 g/0.59 |

It suggests that in the preparation process of cake with a relatively high oil content, by adding oil reducing enzyme into a formula, it can ensure that the overall evaluation of key indicators of the prepared cake did not worsen or substantially worsen, while the usage amount of edible fat and oil in the preparation was greatly reduced, which not only reduced preparation cost of the baked product greatly, but also can significantly reduce the usage amount of edible fat and oil in the preparation process, therefore the prepared baked product also was more aligned with the concept of healthy food.

What is claimed is:

1. A method for reducing the usage amount of edible fat and oil in a baked product prepared from a dough, comprising the steps of:
   (a) incorporating at least one maltose alpha-amylase into the dough;
   (b) incorporating edible fat and oil added in the dough; and
   (c) preparing the baked product from the dough by baking,
   wherein the amount of edible fat and oil in the dough can be reduced by at least 10% by weight relative to the amount of edible fat and oil in the dough under the same conditions, except the maltose alpha-amylase is not added to the dough, and wherein a sensory evaluation of the baked product determines the baked product does not worsen or substantially worsen compared with a baked product prepared under the same conditions except the maltose alpha-amylase-is not added into the dough and the amount of edible fat and oil is not reduced.

2. The method according to claim 1, wherein the dough additionally comprises a cellulase.

3. The method according to claim 1, wherein the content of the edible fat and oil in the baked product is at least 1% (w/w) by weight relative to the baked product.

4. The method according to claim 1, wherein the amount of edible fat and oil in the dough can be reduced by at least 15% relative to that under the same conditions except for not adding the maltose alpha-amylas.

5. The method according to claim 1, wherein the dough further comprises cellulase and/or phospholipase.

6. The method according to claim 1, wherein the baked product is bread, cake, Chinese pastry, soft bread, puff bread, toast, French roll, bun, sponge cake, or chiffon cake.

7. The method according to claim 1, wherein the baked product has a shelf life of at least 4 days or the baked product at day 4 has a lower hardness value and/or higher elasticity value compared with a baked product prepared under the same conditions except the maltose alpha-amylase is not added to the dough and the amount of edible fat and oil is not reduced.

8. The method according to claim 1, wherein in the dough the amount of the maltose amylase is 10-1000 MANU relative to each kilogram of flour.

9. The method according to claim 1, wherein the edible fat and oil is butter, artificial butter, vegetable oil, margarine and/or shortening.

10. The method according to claim 1, wherein the dough further comprises flour, edible salt, edible sugar, edible essence, yeast and/or vitamin C.

11. The method according to claim 1, wherein the baked product is a bread and the sensory evaluation is a comprehensive evaluation of touch softness, bread crumb structure, taste softness, taste moisture, olfactory fragrance, and gustatory aroma.

12. The method according to claim 1, wherein the baked product is a cake, and the sensory evaluation is a comprehensive evaluation of taste softness, taste moisture, melt-in-the-mouth effect, and viscidity of the cake.

13. The method according to claim 1, wherein the amount of edible fat and oil in the dough can be reduced by at least 25% relative to that under the same conditions except for not adding the maltose alpha-amylase.

14. The method according to claim 1, wherein the amount of edible fat and oil in the dough can be reduced by at least 35% relative to that under the same conditions except for not adding the maltose alpha-amylase.

15. The method according to claim 1, wherein the baked product at day 14 has a lower hardness value and/or higher elasticity value compared with a baked product prepared under the same conditions except the maltose alpha-amylase is not added to the dough and the amount of edible fat and oil is not reduced.

\* \* \* \* \*